(12) United States Patent
Doshita et al.

(10) Patent No.: US 6,791,032 B2
(45) Date of Patent: Sep. 14, 2004

(54) FITTING DEVICE OF WIRING HARNESS PROTECTOR MOUNTED IN VEHICLE SLIDING DOOR

(75) Inventors: Kenichi Doshita, Shizuoka (JP); Tohru Aoki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/315,045

(22) Filed: Dec. 10, 2002

(65) Prior Publication Data

US 2003/0141102 A1 Jul. 31, 2003

(30) Foreign Application Priority Data

Jan. 29, 2002 (JP) ........................................ 2002-020264

(51) Int. Cl.$^7$ ................................................. H02G 3/04
(52) U.S. Cl. ..................... 174/135; 174/72 A; 174/136; 439/447
(58) Field of Search ............................ 174/72 A, 72 C, 174/72 R, 135, 136; 439/447

(56) References Cited

U.S. PATENT DOCUMENTS

| | | | | |
|---|---|---|---|---|
| 4,369,947 A | * | 1/1983 | Kuwano | 248/74.2 |
| 5,615,851 A | * | 4/1997 | LeBeau | 248/73 |
| 5,905,231 A | * | 5/1999 | Houte et al. | 174/68.3 |
| 5,962,814 A | * | 10/1999 | Skipworth et al. | 174/135 |
| 6,087,593 A | * | 7/2000 | Skipworth et al. | 174/135 |

* cited by examiner

Primary Examiner—Chau N. Nguyen
Assistant Examiner—Adolfo Nino
(74) Attorney, Agent, or Firm—Armstrong, Kratz, Quintos, Hanson & Brooks, LLP

(57) ABSTRACT

A harness protector provided in a sliding door of a motor vehicle accommodates a wiring harness leading to a vehicle body side. The harness protector has a first wall secured to a door panel of the sliding door by a first securing means, and the harness protector has a second wall opposed to the first wall. The second wall is secured to a door trim of the sliding door by a second securing means. The second securing means may be a fabric fastener. The second securing means may be constituted by a resilient stopper clip and a hole engageable with the stopper clip. The second securing means may be constituted by a stopper protrusion and an engagement portion engageable with the stopper protrusion. The engagement portion has a pair of resilient pinching pieces opposed to each other, and the stopper protrusion enters between the pair of resilient pinching pieces to engage with the engagement portion. The engagement portion may have a through hole and an embossed wall positioned around the through hole, and the stopper protrusion may have a plurality of resilient hook pieces engageable with the embossed wall.

13 Claims, 5 Drawing Sheets

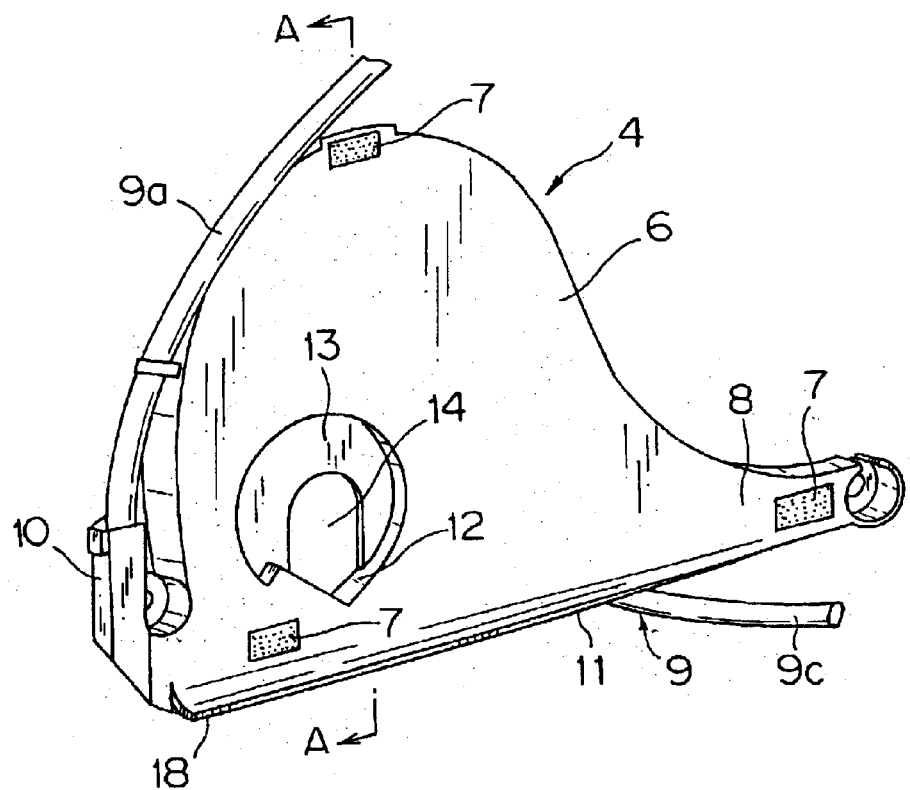
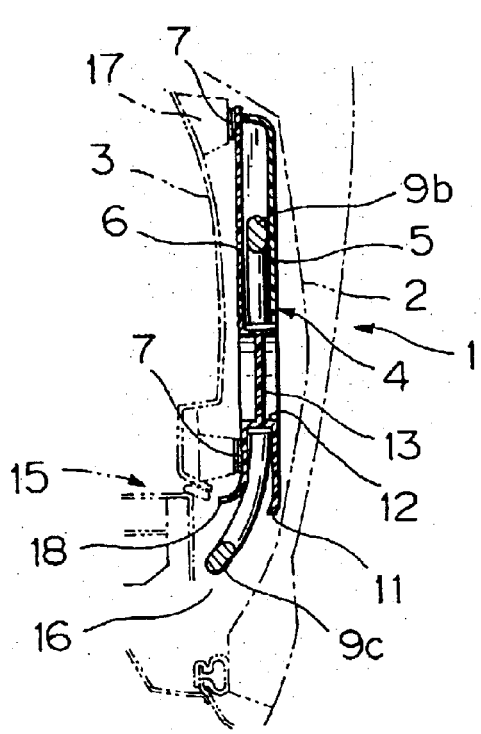 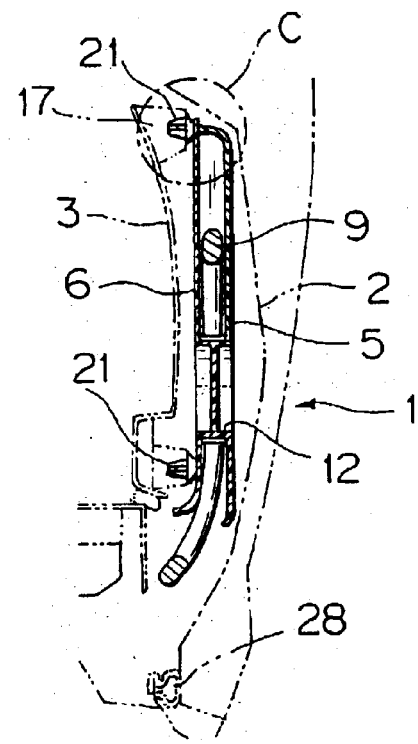
FIG. 1
FIG. 2
FIG. 4

FITTING DEVICE OF WIRING HARNESS PROTECTOR MOUNTED IN VEHICLE SLIDING DOOR

BACKGROUND OF THE INVENTION

1. Field of the Invention

The present invention relates to a fitting device of a wiring harness protector mounted in a sliding door of a motor vehicle. The fitting device prevents deformation of the wiring harness protector disposed in the sliding door to reliably accommodate a wiring harness therein.

2. Related Art

As illustrated in FIG. 16, a wiring harness (a plurality of electrical cables) 70 is arranged in a sliding door 71 of a motor vehicle such as a so-called one-box car. The wiring harness 70 leads to a vehicle body side for supplying electrical powers and electrical signals to electric equipment and auxiliary machineries. The wiring harness 70 is curved within a synthetic resin protector 72 disposed in the sliding door 71 such that the wiring harness 70 can expand and contract in response to opening and closing movements of the sliding door 71.

The protector 72 is defined not only in a rectangular shape but also in a generally semicircular form in conformity with a curved part 70a of the wiring harness 70. The protector 72 has a pair of broad front and rear walls 73 and three narrow walls 74 constituting an upper wall and two side walls. The protector 72 has a slit opening 75 elongated in a longitudinal direction of the sliding door. The protector 72 is secured to a metal door panel 76 with bolts or clips (not shown) at a plurality of peripheral points in a front side of the protector 72. The protector 72 is close to or in contact with a synthetic resin door trim (trim cover) 77 at a rear side thereof. The door trim 77 is fixed to the door panel 76 with bolts or clips 78.

In FIG. 16, when the sliding door 71 slides forward (in a rightward direction in FIG. 16) to fully close the sliding door, the wiring harness 70 is drawn rearward to be stretched as illustrated with chain lines. Meanwhile, when the sliding door 71 sides rearward to fully open the sliding door, the wiring harness 70 is pulled forward to define a smaller radius bend as illustrated generally with solid lines in FIG. 16. The opening and closing movements of the sliding door 71 cause the wiring harness 70 to expand or contract. This decreases the protector 72 in thickness to achieve a reduced volume of the sliding door.

Other than this aspect of the wiring harness protector, it has been proposed that the wiring harness 70 is urged upward by a resilient member within the protector for surely absorbing looseness of the wiring harness 70. In place of the resilient member, it has been proposed that the wiring harness 70 slides in a lower part of the protector 72 with using a horizontal rail and a slider.

However, since the protector 72 with the foregoing structure has thin walls made of a synthetic resin material, the protector 72 may deform in a thickness direction thereof due to heat or an external force. This reduces a harness accommodating space in the protector so that the wiring harness 70 can not move smoothly within the protector 72 during the opening and closing movements of the sliding door 71. At worst, the protector 72 is pushed out of the protector 72 to be pinched between the sliding door 71 and a body of the vehicle, causing damage of the wiring harness.

Furthermore, the protector 72 has the lower slit opening 75 elongated in a longitudinal direction of the car for leading the wiring harness 70 out of a lower side of the door trim 77 so that the lower side of the door trim 77 can not be secured to the door panel 76. Thus, the door trim 77 is not stable enough to prevent deformation or vibration of the door trim 77.

SUMMARY OF THE INVENTION

In view of this situation, a first object of the invention is to provide a fitting device of a wiring harness protector mounted in a vehicle sliding door of a motor vehicle, the harness protector preventing deformation of the wiring harness protector disposed in the sliding door to reliably accommodate a wiring harness therein. A second object of the invention is to provide a fitting device of a wiring harness protector mounted in a vehicle sliding door, the harness protector enabling a sufficient fixture of a door trim.

For achieving the objects, a first aspect of the invention is a fitting device of a wiring harness protector mounted in a sliding door of a motor vehicle, the harness protector accommodating a wiring harness leading to a vehicle body side, the harness protector having a first wall and a second wall opposed to the first wall. The fitting device comprises a first securing means and a second securing means, and the first securing means secures the first wall to a door panel of the sliding door, while the second securing means secures the second wall to a door trim of the sliding door.

The foregoing structure secures the door trim to the second wall of the harness protector, preventing at least an inward deformation of the second wall of the harness protector. Meanwhile, the first wall of the harness protector is secured to the door panel, preventing sufficiently an inward deformation of the first wall of the harness protector. This keeps an enough space in the protector for receiving smoothly reliably the wiring harness. The second wall of the harness protector is secured to the door trim so that the door trim can have an increased rigidity strength, preventing vibration and a noise thereof.

Accordingly, during the opening and closing of the sliding door, the wiring harness is not jammed within the protector, eliminating damage of the wiring harness to ensure a reliable power supply to a side of the sliding door. Furthermore, the looseness and falling-out of the door trim is eliminated, improving the vehicle in reliability.

Preferably, the second securing means is a fabric fastener. Thus, the protector is easily secured to the door trim with the fabric fastener. The fabric fastener provides a little positioning allowance between the harness protector and the door trim, enabling an easy securing work thereof. Alternatively, the second securing means comprises a resilient stopper clip and a hole engageable with the stopper clip. Thus, the stopper clip can secure the harness protector to the door trim more reliably than the fabric fastener.

Preferably, the second securing means comprises a stopper protrusion and an engagement portion engageable with the stopper protrusion. The engagement of the stopper protrusion with the engagement portion reliably secures the harness protector to the door trim with an increased strength.

Preferably, the engagement portion comprises a pair of resilient pinching pieces opposed to each other, and the stopper protrusion enters between the pair of resilient pinching pieces to engage with the engagement portion. Thus, the resilient pinching pieces pinch the stopper protrusion to easily surely hold the stopper protrusion with the insertion completion of the stopper protrusion. Furthermore, the stopper protrusion can be removed from the pinching pieces with ease if desired.

Preferably, the engagement portion comprises a through hole and an embossed wall positioned around the through hole, and the stopper protrusion has a plurality of resilient hook pieces that are engageable with the embossed wall. The resilient hook pieces pass through the hole of the engagement portion so that the hook pieces engage with the embossed wall to secure the harness protector to the door trim. The stopper protrusion is elongated by the provision of the embossed wall so that the resilient hook pieces can deflect with ease. The stopper protrusion can be inserted into and removed from the hole with a less force.

Preferably, the stopper protrusion is horizontally elongated along the second wall of the harness protector. This configuration enables an increased bending strength of the stopper protrusion in a vertical direction thereof, so that the door trim can be supported via the harness protector against the weight and vibration of the door trim. The elongated stopper projection formed on the protector wall surely prevents deformation of the protector wall. Thereby, the wiring harness is reliably accommodated in the protector.

A second aspect of the invention is a fitting device of a wiring harness protector mounted in a sliding door of a motor vehicle, the harness protector accommodating a wiring harness leading to a vehicle body side, the harness protector having a wall secured to a door panel of the sliding door. The fitting device comprises a securing means for securing the wall of the harness protector to the door panel to prevent deformation of the harness protector. Thus, the harness protector has a wall secured to a door panel of the sliding door by a securing means which can prevent deformation at least of the harness protector wall positioned in the door panel side. This can keep an accommodation space for smoothly receiving the wiring harness. During the opening and closing movement of the sliding door, the wiring harness will not be jammed within the protector, eliminating damage of the wiring harness to ensure a reliable power supply to the sliding door side.

Preferably, the securing means is a fabric fastener or an engagement mechanism, the mechanism having a resilient stopper clip and a hole engageable with the stopper clip. The protector is easily secured to the door trim with the fabric fastener. The fabric fastener gives a little positioning allowance between the harness protector and the door trim, enabling an easy securing work thereof. Meanwhile, the stopper clip can secure the harness protector to the door trim more reliably than the fabric fastener.

Preferably, the securing means comprises a holder plate formed on a wall of the door panel and spaced from the door panel to provide a clearance therebetween, and the clearance receives another wall formed on the harness protector to secure the harness protector to the door panel. Thus, the wall of the harness protector is pinched between the door panel and the holder plate, surely preventing deformation of the harness protector wall to keep it straight. Furthermore, an easy insertion of the harness protector wall between the door panel and the holder plate can secure the door panel, improving a workability of the securing step. There may be provided a little positioning allowance between the holder plate and the harness protector.

Preferably, the securing means comprises an insertion opening formed on the door panel and a hook portion formed on a wall of the harness protector, the hook portion spaced from the wall of the harness protector to provide a clearance therebetween, and the clearance receives a wall of the door panel to secure the harness protector to the door panel. The hook portion is inserted into the opening, and the harness protector slides along the door panel wall, so that the door panel wall engages with the clearance between the hook portion and the harness protector wall. This prevents or corrects the deformation of the harness protector wall. The harness protector wall keeps straight along the door panel wall. There may be provided a little positioning allowance between the hook portion and the harness protector wall.

Preferably, another wall of the harness protector is secured to a door trim of the sliding door by another securing means. Thus, the engagement of the door panel and one wall of the harness protector is made simultaneously with the engagement of the door trim and the other wall of the harness protector.

Preferably, the harness protector has a generally circumferential wall for preventing deformation of the harness protector in a thickness direction of the harness protector.

BRIEF DESCRIPTION OF THE DRAWINGS

FIG. 1 is a perspective view showing a first embodiment of a fitting device of a harness protector mounted in a sliding door according to the present invention;

FIG. 2 is a cross-sectional view taken along line A—A of FIG. 1 for showing a fitting state of the harness protector;

FIG. 4 is a cross-sectional view taken along line B—B of FIG. 3 for showing a fitting state of the harness protector;

DETAILED DESCRIPTION OF PREFERRED EMBODIMENTS

Figure 3:
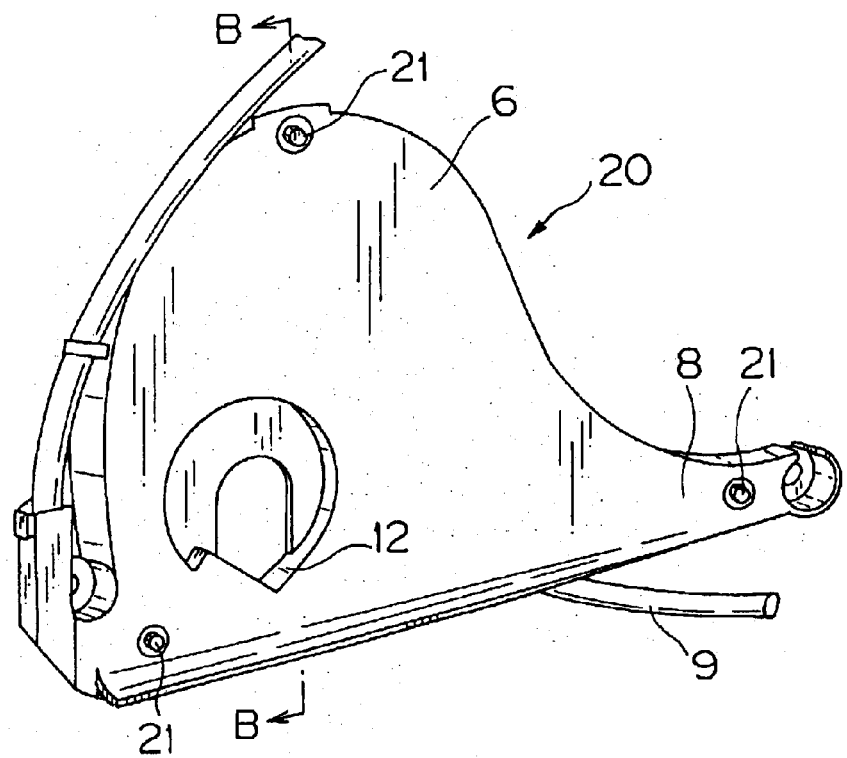
FIG. 3 is a perspective view showing a second embodiment of a fitting device of a harness protector mounted in a sliding door according to the present invention.

Referring to the accompanied drawings, embodiments of the present invention will be discussed hereinafter. FIGS. 1 and 2 show a first embodiment of a fitting device of a wiring harness protector mounted in a sliding door of a motor vehicle.

The harness protector fitting device secures one wall 5 of a synthetic resin harness protector (also called as a protector hereinafter) 4 to a metal door panel 2 of a sliding door 1. Meanwhile, another vertical wall 6 of the harness protector 4 is secured to a synthetic resin door trim (trim cover) 3 disposed in a cabin side of the sliding door 1 by means of fabric fasteners 7.

The fabric fastener 7 has a pair of base members, one of which has many fiber loops, and the other has many hooks or cone shaped protrusions. The base members are fixed to the harness protector 4 or the door trim 3 with an adhesive agent or the like.

In this embodiments, the fabric fastener 7 is disposed at one upper, longitudinally middle point and at two lower, longitudinal end points of a generally semicircular harness protector 4. The three points are vertexes of a triangle. Since the harness protector 4 is generally a semicircular shape, more specifically with a rear extended part 8, the fabric fastener 7 is positioned around three corners of the harness protector 4. Thus, the harness protector 4 is reliably secured to the door trim 3 without looseness.

The fabric fastener 7 may be provided at a vertically middle point of the harness protector 4. The fabric fastener can be fitted on the harness protector 4 after the harness protector 4 is molded from a resin material. Thus, the fitting position of the fabric fastener 7 on the harness protector 4 can be appropriately selected according to a size and a shape of the harness protector 4 or the door trim 3. For example, one fabric fastener 7 may be effectively positioned around a center of the wall 6 of the harness protector 4. These are similar in each embodiment described later.

One vertical wall 5 of the harness protector 4 is secured to the door panel 2 with a securing means (not shown) like bolts, while another vertical wall 6 of the harness protector 4 is secured to the door trim 3 with the fabric fasteners 7. This prevents an inward deformation of each wall 5 or 6, so that the wiring harness 9 is smoothly and reliably moved in the harness protector 4 when the sliding door 1 is opened or closed. Furthermore, the door trim 3 is secured to the door panel 2 via the harness protector 4 to increase the rigidity of the door trim 3, preventing deformation and vibration of the door trim 3 and eliminating an unintentional removal of the door trim 3 from the harness protector 4. These effects are similar in each embodiment described later.

In this embodiment, the harness protector 4 has a main part facing outward of a vehicle cabin and a cover part wall 6 facing inward of the cabin. The cover part wall 6 is fixed to the main part by a fixing means (not shown). The main part and the cover part wall have a semicircular plate, a rear extended portion 8, a fore harness introducing portion 10, and a harness exiting portion 11 which is a lower slit-shaped opening. The semicircular plate is provided with a generally circumferential wall 12 which penetrates through a fore side portion of the semicircular plate in a thickness direction thereof. The circumferential wall 12 is formed with a central vertical wall 13 contiguous with the wall 12.

The circumferential wall 12 increases a rigidity of the harness protector 4 in the thickness direction, preventing an inward deformation of the front and rear walls 5 and 6 of the harness protector 4. Thus, the securing of the harness protector 4 by means of the fabric fasteners 7 and the rigidity of the harness protector 4 surely prevent deformation of the harness protector 4. The fabric fasteners 7 for the harness protector 4 and the circumferential wall 12 may be effective independently.

An inner space 14 surrounded by the circumferential wall 12 is opened outside of the protector. Along a peripheral surface of the circumferential wall 12, the wiring harness 9 can be curved with a minimum radius within the protector. The circumferential wall 12 limits the curvature of the wiring harness 9. The wall 12 may be a completely circumferential wall.

A wiring harness 9a, which is positioned upward from the fore wiring harness introducing part 10 of the harness protector 4, is connected to each of auxiliary electric instruments (not shown) mounted in the sliding door 1. A wiring harness 9b, which is introduced from the wiring harness introducing part 10 into the harness protector 4, is curved along the circumferential wall 12 or above the circumferential wall 12 within the harness protector 4. A wiring harness 9c, which is led out from the bottom opening 11, is connected to a side of the vehicle body 15 via a transition space 16 disposed between the sliding door 1 and the vehicle body 15 as shown in FIG. 2. Thereby, the wiring harness 9a is electrically connected to, for example, a power source.

As illustrated in FIG. 2, a projecting piece 17 is integrally formed with the door trim 3 so as to project from an inner surface of the door trim 3 toward the harness protector 4. The projecting piece 17 has a vertical front surface on which one fabric fastener 7 is fixed. Meanwhile, an associated fabric fastener 7 opposing to the one fabric fastener 7 is fixed on a vertical wall 6 of the harness protector 4. The projecting piece 17 is unitarily formed with the door trim 3 easily when molded from a resin material.

Instead of on the projecting piece 17, one of the pair of the fabric fastener 7 may be disposed on a surface of the door trim 3, while the other is disposed on the wall 6 of the harness protector 4. The fabric fasteners 7 provide an easy securing means between the harness protector 4 and the door trim 3.

The harness protector 4 has a wall 18 bent toward the door trim 3 at the bottom opening 11 of the harness protector 4, which is a guide portion for smoothly guiding the wiring harness 9a to a side of the vehicle body 15. Preferably, one of the fabric fasteners 7 is positioned above and near the guide portion 18 but not to interfere with the guide portion 18.

The wiring harness 9 is received in, for example, a corrugated tube having an elongated circular section as corresponding to a small depth of the harness protector 4. The wiring harness 9 is resiliently biased upward within the harness protector 4, for example, by an elastic member like a flat spring so that the wiring harness 9 is curved upward, absorbing looseness of the wiring harness 9.

Figure 5:
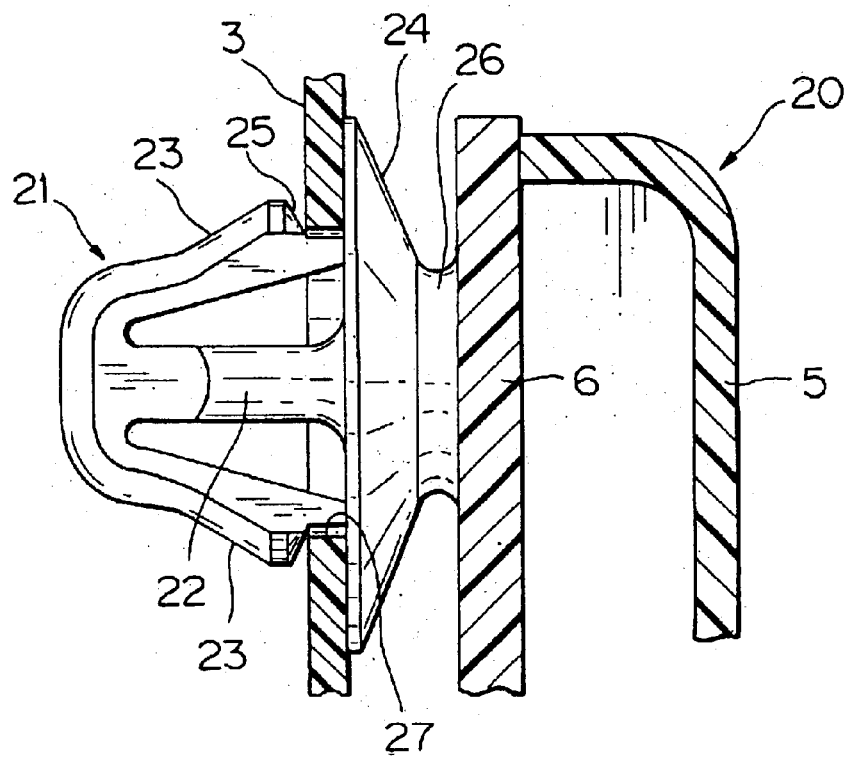
FIG. 5 is an enlarged cross-sectional view of an encircled part C of FIG. 4 for showing the fitting device provided with clips.

FIGS. 3 to 5 show a second embodiment of a fitting device of a wiring harness protector mounted in a sliding door of a motor vehicle. This fitting device is characterized in that a wiring harness protector 20 is provided with a stopper clip 21 as a securing means in place of the fabric fastener 7 of the first embodiment. The constitutions of the second embodiment except of the stopper clip 21 are the same as those of the first embodiment, so that the same reference numerals are used for the same components, which will not be discussed again.

As shown in FIG. 5, the stopper clip 21 has a pair of resilient stopping pieces 23 at a fore end of a supporting column 22. The stopper clip 21 has a dished resilient body 24 at a base end of the supporting column 22. The stopper clip 21 having a profile along the supporting column 22 is formed with an engagement shoulder 25. The dished resilient body 24 is divergent toward the stopping piece 23 and is contiguous with a circular support 26 at a base end thereof. The support 26 is joined to a vertical wall 6 of the protector 20.

The stopper clip 21 can be molded from a resin material unitarily with the protector 20. The clip itself has a known configuration. The stopping piece 23 may be four instead of two or may be defined like a cone shape. The stopper clip 21 may be a body formed separately from the protector 20.

The door trim 3 is formed with an engagement through hole 27 having a diameter smaller than a maximum diameter of the stopper clip 21. The stopping piece 23 of the stopper clip 21 is inserted into and engaged with the through hole 27 of the door trim 3, when the door trim 3 is secured to the door panel 2 after the protector 20 is fixed to the metal door panel 2 (FIG. 4). During the insertion of the stopping piece 23 into the through hole 27, the stopping piece 23 slides along a periphery of the through hole 27 to advance inward. On the complete insertion of the stopping piece 23, the stopping piece 23 returns to its original shape by its resiliency, so that the shoulder 25 of the stopping piece 23 engages with a periphery of the through hole 27. The dished resilient body 24 receives a compression force and pinches the door trim 3 between the shoulder 25 and the resilient body 24 without looseness.

As illustrated in FIG. 3, the semicircular protector 20 of the second embodiment has one stopper clip 21 at an upper part of the vertical wall 6 of the protector 20 and two stopper clips 21 each at a lower fore or rear part of the wall 6 in the same way as the fabric fasteners 7 of the first embodiment. Each of the three stopper clips 21 is positioned around each of three corners of the protector 20, so that the protector 20 is stably secured to the door trim 3. The positions and the number of the stopper clips 21 are appropriately selected according to the shape of the protector 20 and the arrangement of the through hole 27 of the door trim 3. The protector 20 of the second embodiment has the three stopper clips 21 each positioned at a corner of the protector 20. The stopper clips 21 are positioned to define a triangle, providing a securing strength enough for preventing deformation of the protector 20.

As illustrated in FIG. 4, the through hole 27 of the door trim 3 is formed in a vertical wall of each of upper and lower projecting pieces 17. The through hole 27 is designed as corresponding to the configuration of the protector 20. Reference numeral 28 of FIG. 4 designates a waterproof weather seal. In FIG. 5, the main part and the cover of the protector 20 may be appropriately selected. It may be possible that the stopper clip 21 is disposed on the door trim 3 while the through hole 27 is formed in the protector 20, in which the stopper clips 21 are positioned not to interfere with the wiring harness 9.

One vertical wall 5 of the protector 20 is firmly fixed to the door panel 2 with a securing means (not shown) like bolts. The other vertical wall 6 of the protector 20 is secondarily secured to the door trim 3 with the stopper clips 21. This prevents inward and outward deformations of each wall 5 or 6, and, during the opening and closing operations of the sliding door 1, the wiring harness 9 is smoothly moved in the protector 20 with ease. Furthermore, the door trim 3 is secured to the door panel 2 via the protector 20 with an increased strength, preventing deformation and vibration of the door trim 3 and eliminating an unintentional removal of the door trim 3 from the door panel 2.

Like the first embodiment, a generally circumferential wall 12 is provided to perpendicularly penetrate through the vertical side walls 5 and 6 at a fore half central part of the protector 20. This prevents a larger inward and outward deformation of the protector 20, reliably smoothly receiving the wiring harness 9. The protector 20 having no deformation improves the securing of the door trim 3 to the door panel 2. One lower stopper clip 21 is positioned forward from the circumferential wall 12, while the other lower stopper clip 21 is positioned at the extended part 8 of the protector 20.

FIGS. 6 to 9 show a third embodiment of a fitting device of a wiring harness protector mounted in a sliding door of a motor vehicle. This fitting device is disposed in a wiring harness protector 30 and is provided with an elongated stopper projection 31 as a securing means in place of the narrow width stopper clip 21 of the second embodiment. The door trim 3 has an engagement portion 32 which is an elongated rectangular hole or recess engageable with the stopper projection 31. The constitutions of the third embodiment except of the stopper projection 31 are the same as those of the first and second embodiments, so that the same reference numerals are used for the same components, which are not discussed again.

Figure 6:
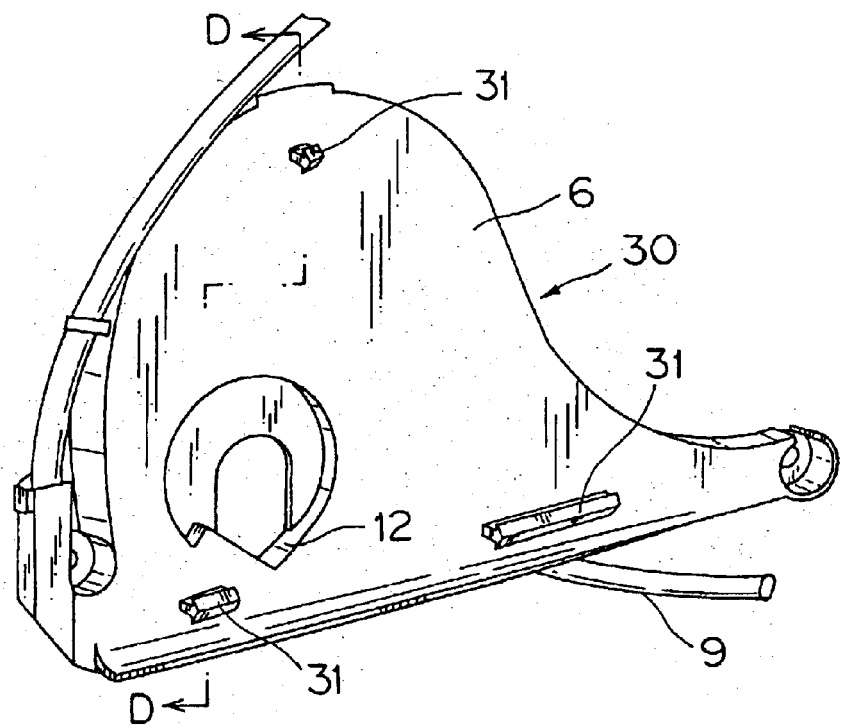
FIG. 6 is a perspective view showing a third embodiment of a fitting device of a harness protector mounted in a sliding door according to the present invention.

As illustrated in FIG. 6, there is provided a slightly elongated stopper projection 31 at an upper point of the protector 30, a medium-elongated stopper projection 31 at a fore lower point of the protector 30, and a largely elongated stopper projection 31 at a rear lower point of the protector 30. The elongated horizontal lengths of the stopper projections 31 are appropriately determined according to shapes of the protector 30 and the door trim 3. As corresponding to the horizontal lengths of the stopper projections 31, the horizontal lengths of the engagement portions 32 are determined. These designs are the same in other embodiments shown in FIGS. 10 and 11.

Figure 7:
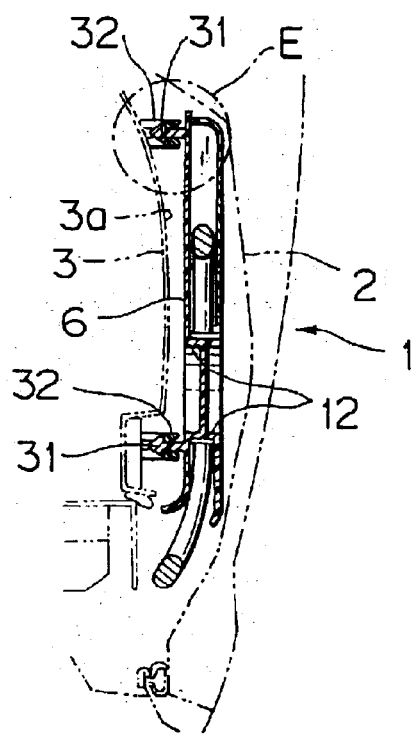
FIG. 7 is a cross-sectional view taken along line D—D of FIG. 6 for showing a fitting state of the harness protector.

In the third embodiment, preferably, the three stopper projection 31 are positioned on the protector 30 in conformity with the shape of the semicircular protector 30 at points defining a triangle like the first and second embodiments. The fore lower stopper projection 31 is positioned a little forward from the circumferential wall 12 of the protector 30. The three stopper projections 31 are positioned to surround the circumferential wall 12, so that the engagement of the stopper projections 31 with the door trim 3 prevents deformation of the protector 30 in addition to a deformation limiting effect of the circumferential wall 12. As illustrated in FIG. 7, the circumferential wall 12 is formed unitarily with the cover wall 6 of the protector 30 and unitarily with the main part wall 5 of the protector 30 such that an outer edge of the circumferential wall 12 is contiguous with the main part wall 5.

As illustrated in FIG. 7, the engagement portion 32 projects from a rear side of the door trim 3. The height of the engagement portion 32 is determined such that the engagement portion 32 projects above a top surface 3a of the curved door trim 3. The engagement portion 32 receives and engages with the stopper projection 31 of the protector 30. The projecting heights of the stopper projection 31 and the engagement portion 32 are appropriately determined to surely secure the protector 30 to the curved door trim 3. The stopper projection 31 and the engagement portion 32 may be provided at a middle height point of the protector 30 in addition to the upper and lower ones.

Figure 8:
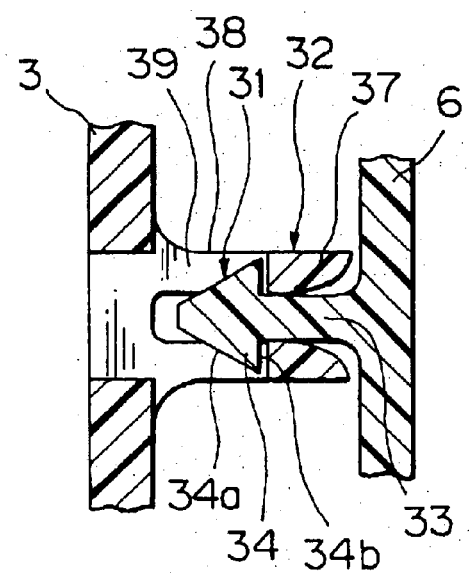
FIG. 8 is an enlarged cross-sectional of an encircled part E of FIG. 7 for showing the fitting device provided with stopper protrusions.
Figure 9:
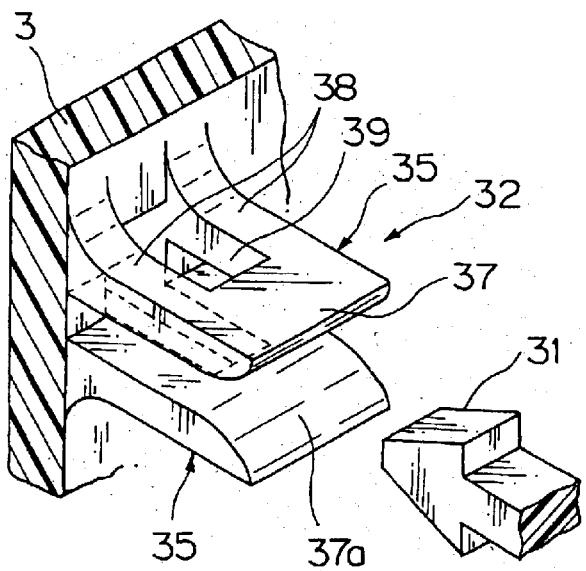
FIG. 9 is a broken perspective view showing an example of the stopper projection and an engagement portion of FIG. 6.

As illustrated in FIGS. 8 and 9, the stopper projection 31 has a pair of hooking portions 34 each having a supporting column 33. The supporting column 33 is formed on the vertical wall 6 of the protector 30 to extend horizontality as shown in FIG. 6. The horizontal supporting column 33 can sufficiently support the door trim 3 against a gravity force of the door trim 3, and prevents deformation and damage of the stopper projection 31 due to vibration of the vehicle. The hooking portion 34 has a pair of tapered fore surfaces 34*a* and a vertical base end 34*b* defining an engagement face.

In FIGS. 8 and 9, the engagement portion 32 associated with the stopper projection 31 has a pair of horizontal resilient pinching pieces 35, each of which is formed with an inner curved guide surface 37*a* at a fore end thereof to smoothly insert the stopper projection 31 between the pinching pieces 35. The pinching piece 35 has a pair of parallel bars 38 opposed to each other and a joining piece 37 for joining the parallel bars 38 to define a middle rectangular hole 39. The pair of the parallel bars 38 are perpendicular to and contiguous with the door trim 3. The engagement portion 32 is molded unitarily with the door trim 3 from a resin material.

The insertion of the stopper projection 31 between the pair of upper and lower pinching pieces 35 deflects the pinching pieces 35 vertically. Then, the hooking portion 34 engages with the rectangular hole 39 of the pinching piece 35 while each base end 34*b* returns back, so that a base end 34*b* of the hooking portion 34 abuts against an inner surface (engagement surface) of the joining piece 37. Thus, the stopper projection 31 is stopped by the engagement portion 32. The engagement is easily released by widening the clearance between the pair of the pinching pieces 35 if desired.

The pair of pinching pieces 35 vertically opposed to each other provide an increased strength against the self weight of the door trim 3, and the securing strength of the stopper projection 31 increases, surely preventing undesirable falling-out of the door trim 3 due to vertical vibration during a running state of the vehicle.

FIG. 8 shows an example of the engagement portion. One of the parallel bars 38 of the pinching piece 35 shown in FIG. 9 maybe eliminated. But, the remaining parallel bars 38 of pinching pieces 35 positioned in a longitudinal direction of the vehicle are selected to prevent an undesirable longitudinal sliding-out of the stopper projections 31. It may be possible that the door trim 3 has the stopper projections 31 while the protector 30 has the engagement portions 32.

Figure 10:
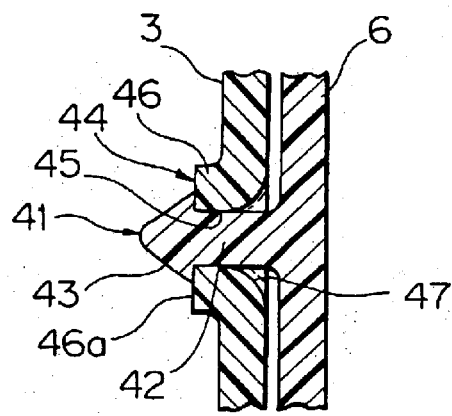
FIG. 10 is a longitudinal sectional view showing another example of a stopper projection and an engagement portion.

FIG. 10 shows a second example of a fitting device having a stopper protrusion and an engagement portion. A stopper projection 41 of the second example has a supporting column 42 and a pair of hooking portions 43 like the first example shown in FIG. 8. An engagement portion 44 of the second example has a rectangular through hole 45 and a rectangular embossed wall 46 surrounding the through hole 45. The embossed wall 46 projects parallel to the insertion direction of the stopper projection 41. The embossed wall 46 has an outer surface 46*a* which engages with an engagement surface of the hooking portion 43. The through hole 45 is formed with a tapered or curved guide 47 in an entrance side thereof. The embossed wall 46 and the hooking portions 43 are slightly flexible so that the hooking portion 43 can be inserted into the through hole 45. The through hole 45 and the surrounding embossed wall 46 are molded unitarily with the door trim 3 from a resin material.

The supporting column 42 of the stopper projection 41 may be not only rectangular but also circular in section. The through hole 45 may be also circular as corresponding to the circular supporting column 42, and the hooking portion 43 may be configured in a cone shape. The stopper projection 41 is formed unitarily with the vertical wall 6 of the protector while the engagement portion 44 is formed in the door trim 3, and vice versa. When the through hole 45 is provided in the protector, the stopper projection 41 formed on the door trim 3 is positioned not to interfere with the wiring harness when inserted into the through hole 45.

Figure 11:
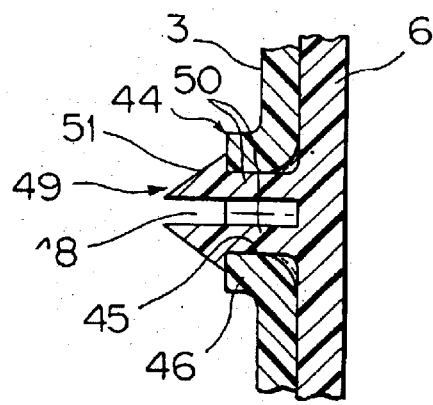
FIG. 11 is a longitudinal sectional view showing further another example of a stopper projection and an engagement portion.

FIG. 11 shows a third example of a fitting device having a stopper protrusion and an engagement portion. This structure has a center slit 48 formed in the stopper projection 41 of FIG. 10, which allows an inward deflection of a stopper projection 49 so that the stopper projection 49 can be inserted into or removed from the through hole 45 of the engagement portion 44 more easily.

The stopper projection 49 has a pair of upper and lower flexible hooking pieces 50 opposed to each other. The slit 48 defined between the pair of the hooking pieces 50 is a deflection space for the hooking pieces 50. Each hooking piece 50 has a hooking edge 51 which can abut against a fore engagement surface of the embossed wall 46 of the through hole 45 to stop the hooking piece 50. The release of the stopper projection 49 from the through hole 45 is easily carried out by pinching the pair of hooking edges 51 with fingers or pinchers or by pulling the door trim 3 strongly in the disengaging direction.

Like the second example, the stopper projection 49 and the engagement portion 44 are disposed on the door trim or the protector. There may be provided more than two hooking pieces 50, and such hooking pieces 50 may be separated from each other to be parallel to each other. Alternatively, three or more hooking pieces 50 may be circumferentially disposed as corresponding to a circular through hole 45. The engagement portion 44 is constituted by the through hole 45 and the embossed wall 46 surrounding the through hole 45.

Each of the embodiments shown in FIGS. 1 to 11 includes a structure for preventing deformation of the vertical wall 6 of the protector 4, 20, or 30, the wall 6 facing the door trim 3. Next, referring to FIGS. 12 to 15, a structure for preventing deformation of a vertical wall 5 of the protector will be discussed. The wall 5 faces the door panel 2.

Figure 12:
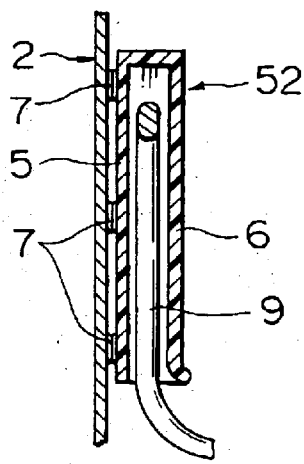
FIG. 12 is a longitudinal sectional view showing a fourth embodiment of a fitting device of a harness protector mounted in a sliding door according to the present invention.

A forth embodiment of FIG. 12 is characterized in that a synthetic resin harness protector 52 has a vertical wall 5 which is secured to a metal (inner panel) door panel 2 with an ordinary securing means (not shown) such as bolts and clips, and the wall 5 is also secured to the door panel 2 with a plurality of fabric fasteners 7 which are an auxiliary securing means for preventing deformation of the wall 5.

The fabric fastener 7 is provided on upper, middle, and lower points of the vertical wall 5 of the harness protector 52, preventing an inward deformation of the thin wall 5 of the harness protector 52. Thus, the wiring harness 9 is smoothly received surely in the harness protector 52 without scratches. Furthermore, the harness protector 52 is primarily secured to the door panel 2 at a plurality of peripheral points (for example, three) like a conventional art. The fabric fastener 7 is configured the same as that of FIG. 1, which is not discussed again. One of the pair of fabric fasteners 7 is provided on the door panel 2, while the other fabric fastener 7 is disposed on the harness protector 52. The fabric fasteners 7 have a hock surface or a loop surface.

The fabric fastener 7 is disposed not only at an upper or lower point of the harness protector 52 but also at an intermediate point where a deflection of the harness protector 52 may be the largest to surely prevent a wide deformation of the harness protector 52. Without the primary securing means such as bolts, a plurality of the fabric fasteners 7 may secure the harness protector 52 to the door panel 2. The door panel 2 may be made not of metal but also of a synthetic resin material or a carbon fiber material. These may be applied to embodiments described hereinafter.

Figure 13:
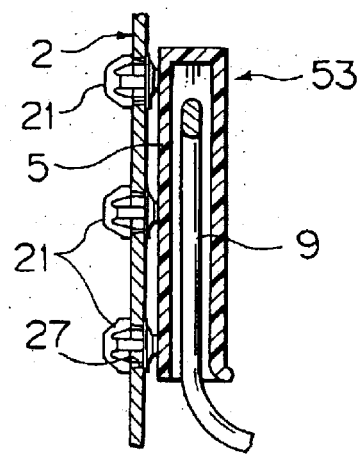
FIG. 13 is a longitudinal sectional view showing a fifth embodiment of a fitting device of a harness protector mounted in a sliding door according to the present invention.

A fifth embodiment shown in FIG. 13 is characterized in that a synthetic resin harness protector 53 has a vertical wall 5 which is secured to a metal (inner panel) door panel 2 with an ordinary securing means (not shown), and the wall 5 is also secured to the door panel 2 with a plurality of stopper clips 21 which are an auxiliary securing means for preventing deformation of the wall 5. The stopper clip 21 is configured the same as that of FIG. 6, which is not discussed again. The stopper clip 21 may be disposed at an intermediate point where a deflection of the harness protector 53 may be the largest to surely prevent a wide deformation of the harness protector 52 due to heat or an external force.

When the harness protector 53 has an inward deformation provided during molding from a resin material, the deformation is corrected by engaging the stopper clip 21 with a hole of the door panel 2. This is the same as in the fixture of the door trim 3, and not only the stopper clip 21 but also another securing means like the fabric fastener 7 can provide the same effects.

Figure 14:
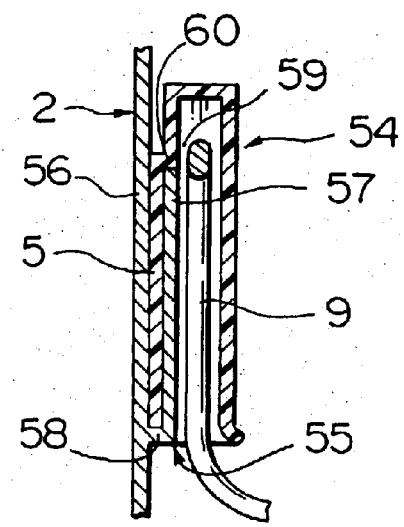
FIG. 14 is a longitudinal sectional view showing a sixth embodiment of a fitting device of a harness protector mounted in a sliding door according to the present invention.

A sixth embodiment of FIG. 14 is characterized in that the door panel 2 has a slot 55 for receiving a vertical wall 5 of a harness protector 54. The slot 55 is formed with a resilient L-shaped holding plate 57 which may be defined by cutting and bending a part of a vertical panel wall 56. Between the holding plate 57 and the panel wall 56, the wall 5 of the harness protector 54 is inserted, and the resilient holding plate 57 can hold the wall 5 without looseness. The holding plate 57 is parallel to the panel wall 56 and is joined to the panel wall 56 via a horizontal short bottom 58. Alternatively, an L-shaped metal holding plate 57 may be separately formed and the holding plate 57 may be welded with a metal panel wall 56.

A clearance between the holding plate 57 and the panel wall 56 is preferably equal to or slightly smaller than a thickness of the wall 5 of the harness protector 54. The holding plate 57 is vertically inserted into an inner space 59 of the harness protector 54. The harness protector 54 has an upper shoulder 60 abutting against a fore end of the holding plate 57. Alternatively, a lower end of the wall 5 of the harness protector 54 may abut agaist the horizontal short bottom 58 of the holding plate 57 for positioning the holding plate 57.

Thus, the protector vertical wall 5 having a comparatively larger area is pinched between the panel wall 56 and the holding plate 57, which surely prevents deformation of the wall 5 of the harness protector 54 so that the wiring harness 9 is smoothly moved in the protector. The harness protector 54 is primarily secured to the door panel 2 with a securing means like bolts at peripheral points of the harness protector 54.

An easy work that the wall 5 of the harness protector 54 is inserted downward into the clearance of the holding plate 57 can prevent deformation of the harness protector 54. The insertion preliminarily secures the harness protector 54, so that the harness protector 54 is finally secured to the door panel 2 by bolts with ease.

Figure 15:
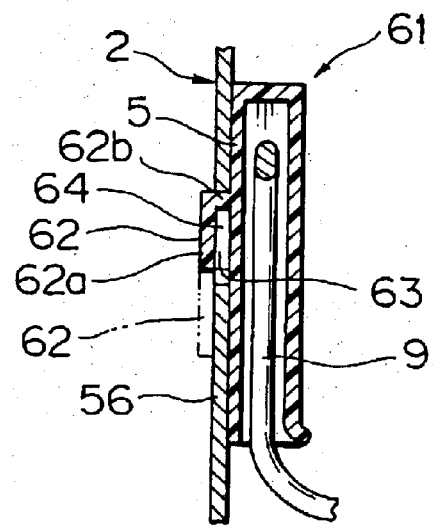
FIG. 15 is a longitudinal sectional view showing a seventh embodiment of a fitting device of a harness protector mounted in a sliding door according to the present invention.
Figure 16:
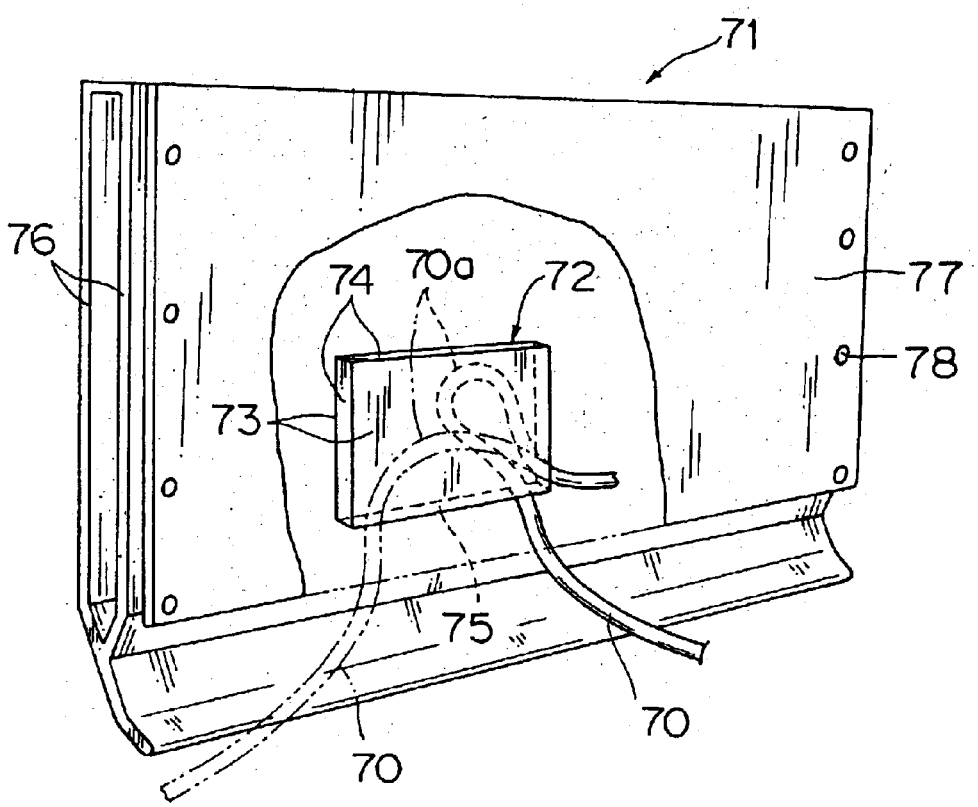
FIG. 16 is a perspective view showing an ordinary fitting device of a harness protector mounted in a sliding door.

A seventh embodiment shown in FIG. 15 has a downward oriented hook 62 unitarily formed with a vertical wall 5 of a harness protector 61, while the panel wall 56 of the door panel 2 is provided with an opening 63 for passing the hook 62. The hook 62 is passed through the opening 63 and is engaged with a panel wall 56 under the opening 63 as illustrated with a chain line.

A clearance 64 between the hook 62 and the wall 5 of the harness protector 61 is equal to or slightly smaller than a thickness of the panel wall 56, so that the panel wall 56 is inserted into between the hook 62 and the panel wall 56 without looseness. The hook 62 is defined in an L-shape having a vertical hooking piece 62a and a horizontal base piece 62b. The hooking piece 62a is parallel to the wall 5 of the harness protector 61. Preferably, the hook 62 is provided at a middle height of the harness protector 61.

The engagement of the hook 62 with the panel wall 56 prevents or corrects an inner deformation of the vertical wall 5 of the harness protector 61, so that the wiring harness 9 is surely received in the harness protector 61 with ease. An easy work, by which the hook 62 is inserted into the opening 63 of the panel wall 56 and pushed downward, can secure the harness protector 61 to the door panel 2 for preventing deformation thereof. Thereby, the harness protector 61 is preliminarily secured to the door panel 2, and the harness protector 61 is finally secured to the door panel 2 with ease. In place of the opening 63, a notch may be provided.

A stopper projection provided between the door panel 2 and one of the protectors 52, 53, 54, and 61 of the embodiments shown in FIGS. 12 to 15 may be combined with another stopper projection provided between the door trim 3 and one of the protectors 4, 20, and 30 of the embodiments shown in FIGS. 1 to 11. Thereby, one vertical wall 5 of the protector is secured to the door panel 2 with one of the deformation preventing means 7, 21, 55, and 62, while the other vertical wall 6 of the protector is secured to the door trim 3 with one of the deformation preventing means 7, 31, 41, and 49. This prevents deformation of the walls 5 and 6, so that the wiring harness 9 is more smoothly received in the protector, preventing an undesirable jamming of the wiring harness 9 between the sliding door 1 and the vehicle body 15.

The protectors 52, 53, 54, and 61 of the embodiments shown in FIGS. 12 to 15 may effectively have a circumferential wall 12 similar to those shown in FIGS. 1, 3, and 6 for preventing deformation thereof. The configurations of the slot 55 and the hook 62 shown in FIGS. 14 and 15 may be applied to the protector wall 6 facing the door trim 3.

What is claimed is:

1. A fitting device of a wiring harness protector mounted in a sliding door of a motor vehicle, the harness protector accommodating a wiring harness leading to a vehicle body side, the harness protector having a first wall and a second wall opposed to the first wall, the wiring harness curved within the harness protector, wherein the fitting device comprises a first securing means and a second securing means, and the first securing means secures the first wall to a door panel of the sliding door, while the second securing means secures the second wall to a door trim of the sliding door, to prevent an inward deflection of the second wall.

2. The fitting device as claimed in claim 1 wherein the second securing means comprises a fabric fastener.

3. The fitting device as claimed in claim 1 wherein the second securing means comprises a resilient stopper clip and a hole engageable with the stopper clip.

4. The fitting device as claimed in claim 1 wherein the second securing means comprises a stopper protrusion and an engagement portion engageable with the stopper protrusion.

5. The fitting device as claimed in claim 4 wherein the engagement portion comprises a pair of resilient pinching pieces opposed to each other, and the stopper protrusion enters between the pair of resilient pinching pieces to engage with the engagement portion.

6. The fitting device as claimed in claim 4 wherein the engagement portion comprises a through hole and an embossed wall positioned around the through hole, and the stopper protrusion has a plurality of resilient hook pieces that are engageable with the embossed wall.

7. The fitting device as claimed in claim 4 wherein the stopper protrusion is elongated along the second wall of the harness protector.

8. The fitting device as claimed in claim 1 wherein the harness protector has a generally circumferential wall for preventing deformation of the harness protector in a thickness direction of the harness protector.

9. A fitting device of a wiring harness protector mounted in a sliding door of a motor vehicle, the harness protector accommodating a wiring harness leading to a vehicle body side, the harness protector having a wall secured to a door panel of the sliding door, the wiring harness curved within the harness protector, wherein the fitting device comprises a securing means for securing the wall of the harness protector to the door panel prevent an inward deformation of the wall of the harness protector, wherein the securing means comprises a holder plate formed on a wall of the door panel and spaced from the door panel to provide a clearance therebetween, and the clearance receives a wall formed on the harness protector to secure the harness protector to the door panel.

10. The fitting device as claimed in claim 9 wherein the securing means comprises a plurality of fabric fasteners or engagement mechanisms which are arranged and configured to prevent the deformation of the wall of the harness protector, the mechanism having a resilient stopper clip and a hole engageable with the stopper clip.

11. The fitting device as claimed in claim 9 wherein the securing means comprises an insertion opening formed on the door panel and a hook portion formed on a wail of the harness protector, the hook portion spaced from the wall of the harness protector to provide a clearance therebetween, and the clearance receives a wall of the door panel to secure the harness protector to the door panel.

12. The fitting device as claimed in claim 9 wherein the harness protector has another wall that is secured to a door trim of the sliding door by another securing means.

13. The fitting device as claimed in claim 9 wherein the harness protector has a generally circumferential wall for preventing deformation of the harness protector in a thickness direction of the harness protector.

* * * * *